Patented Apr. 15, 1930

1,754,475

UNITED STATES PATENT OFFICE

ROBERT B. MacMULLIN, OF NIAGARA FALLS, NEW YORK, ASSIGNOR TO THE MATHIESON ALKALI WORKS, INC., OF NEW YORK, N. Y., A CORPORATION OF VIRGINIA

PRODUCTION OF NEW HYPOCHLORITE COMPOSITIONS

No Drawing.     Application filed September 27, 1928.   Serial No. 308,885.

This invention relates to improvements in the production of the new hypochlorite compound described in the application filed by Maurice C. Taylor and me August 16, 1928, Serial No. 300,148. The invention is a new process for producing this new product.

This new hypochlorite compound is a triple salt having a composition corresponding to the formula $Ca(OCl)_2.NaOCl.NaCl.12H_2O$. It is easily identified not only by analysis but also by its crystalline form and optical properties. The crystals belong to the hexagonal system and appear as hexagonal prisms with each edge bevelled. The crystals are anisotropic when viewed from the side and isotropic when viewed from the end.

I have found that this new triple salt can be produced by chlorinating a mixture of caustic soda and calcium hydroxide in a solution saturated with respect to sodium chloride and the triple salt and crystallizing the new triple salt from the chlorinated solution after separating sodium chloride precipitated during the chlorination.

In one particularly advantageous way of carrying out the invention, the chlorination is effected in two stages; during the first stage the conditions of temperature and concentration are regulated so that only sodium chloride precipitates during the chlorination, the precipitated sodium chloride is separated and the chlorination resumed and, after the separation of precipitated sodium chloride, during the second stage the conditions of temperature and concentration are regulated so that the new triple salt will crystallize when the state of supersaturation is overcome either spontaneously or by seeding with crystals of the triple salt. For example:

A mixture of two equivalents of sodium hydroxide (NaOH) and one equivalent of calcium hydroxide $(Ca(OH)_2)$ may be chlorinated completely in a solution saturated with respect to sodium chloride (NaCl) and the new triple salt $(Ca(OCl)_2.NaOCl.NaCl.12H_2O)$ at a temperature approximating 10° C., precipitated sodium chloride separated from the solution, additional sodium hydroxide and calcium hydroxide in the same equivalent ratio added to the solution and chlorinated completely at a temperature approximating 10° C., and the new triple salt then crystallized from the solution in a substantially pure state at a temperature approximating 0° C. The mother liquor remaining may be used cyclically as a chlorination medium in the process.

In another way of carrying out the invention, the chlorination is effected in but one stage; the conditions of temperature and concentration are regulated so that only sodium chloride precipitates during the chlorination, the precipitated sodium chloride or part of it is separated and the new triple salt is crystallized from the chlorinated solution, for example by seeding with crystals of this triple salt. The yield of the triple salt so obtained is not as large as in the two stage chlorination operation. To increase the yield of the triple salt, the chlorinated solution may be maintained saturated with respect to sodium chloride during the crystallization, for example by adding sodium chloride during the crystallization (part of the sodium chloride previously separated may be so used) or by separating only enough sodium chloirde in the preceding step to leave enough to maintain this saturation. For example:

A mixture of two equivalents of sodium hydroxide and one equivalent of calcium hydroxide may be chlorinated completely in a solution saturated with respect to sodium chloride and the new triple salt at a temperature approximating 10° C., precipitated sodium chloride separated from the solution, and the new triple salt then crystallized from the solution in a substantially pure state at a temperature approximating 0° C. Again, the mother liquor remaining may be used cyclically as a chlorination medium in the process.

In both of the operations just described, the new triple salt is maintained in solution or in supersaturated solution during the separation of the excess sodium chloride produced in the chlorination. The operation first described provides for separation of sodium chloride at a point at which the solution is but moderately supersaturated with respect to the new triple salt and therefore relatively stable. All of the precipitated sodium chloride is with advantage separated between the stages of chlorination in the operation first described. The further chlorination not only produces additional sodium chloride but also additional calcium hypochlorite and additional sodium hypochlorite.

The invention will be further illustrated by the following more detailed example of the operation first described, but it will be understood that the invention is not limited thereto.

*For example.*—25.4 parts (by weight) of a 50% solution of NaOH and 6.3 parts of hydrated lime (94% $Ca(OH)_2$) are added to 173 parts of an eutectic solution having about the following composition.

| | Per cent |
|---|---|
| $Ca(OCl)_2$ | 6.6 |
| NaOCl | 3.1 |
| NaCl | 19.2 |
| $H_2O$ | 71.7 |

Chlorination is carried to completion at 10° C., and, the supernatant solution, having about the following composition, is decanted from the precipitated sodium chloride:

| | Per cent |
|---|---|
| $Ca(OCl)_2$ | 10.1 |
| NaOCl | 4.7 |
| NaCl | 16.9 |
| $H_2O$ | 68.3 |

17.7 parts of a 50% solution of NaOH and 4.4 parts of hydrated lime (94% $Ca(OH)_2$) are added to 195 parts of the solution so obtained, the solution being maintained at 10° C. or below, and chlorination again carried to completion at 10° C. or below, the solution finally being brought to 0° C. Near the end of the chlorination crystals of the new triple salt begin to form spontaneously. Following completion of the crystallization at 0° C. or below, the crystallized triple salt is centrifugally separated from the mother liquor. A yield upwards of about 60 parts of crystals of the new triple salt having, while still contaminated with a trace of the mother liquor, about the following composition is obtained:

| | Per cent |
|---|---|
| $Ca(OCl)_2$ | 27.8 |
| NaOCl | 12.6 |
| NaCl | 13.3 |
| $H_2O$ | 46.3 |

The operation just described in detail in the fore-going example may be carried out cyclically, using the mother liquor remaining as a chlorination medium in the operation.

*For example.*—About 164 parts of mother liquor is separated from the crystallized triple salt. The precipitated sodium chloride separated following the first chlorination includes a small amount of the hypochlorite solution. This separated salt is washed with just enough water to form an eutectic solution of the same composition as that used in the first chlorination. 9 parts of the eutectic solution can usually be so recovered and this so recovered solution, added to the 164 parts of the eutectic solution separated as mother liquor from the crystallized triple salt, gives 173 parts of the eutectic solution with which the operation is repeated as described.

It will be understood that the foregoing example is intended but to illustrate the invention. The specific details given are results obtained in actual operation of the invention; but it will be apparent that these details may be varied in carrying out the invention. For example:

If the operation is to be carried out cyclically, it is best to keep the equivalent ratio of sodium hydroxide to calcium hydroxide close to 2:1. However, the operation need not be carried out cyclically. If the equivalent ratio varies much from 2:1, the composition of the mother liquor remaining after crystallization of the triple salt will progressively change until a point is reached at which it is no longer possible to obtain the new triple salt in a pure state if the operation is carried out cyclically. The mother liquor may then be discarded or used for some purpose other than as a chlorination medium in the process or its composition may be adjusted to make it suitable for further use as a chlorination medium in the process. The proportion of sodium hydroxide and calcium hydroxide to the eutectic solution is widely variable; the maximum proportion is that beyond which supersaturation with respect to the new triple salt cannot be maintained during the first chlorination. To carry out the invention it is essential to effect a separation of sodium chloride before crystallization of the new triple salt begins. With the proportions given in the foregoing specific example supersaturation with respect to the new triple salt is easily maintained, but a higher proportion of sodium hydroxide and calcium hydroxide to the eutectic solution may be used. It is not material when crystallization of the new triple salt begins after the sodium chloride precipitated in the first chlorination is separated; the presence of crystals of the new triple salt does not interfere with the second chlorination. The sodium hydroxide and the calcium hydroxide may be supplied to either chlorination either mixed or separately in either order and either at the beginning of the chlorination or progressively during the chlorination.

The chlorination and the crystallization of the new triple salt may be carried out over a range of temperatures. The chlorination preceding the separation of sodium chloride is with advantage carried out at a temperature not exceeding about 12° C.; the range of 0–10° C. is usually satisfactory although lower temperatures may be used. Any chlorination following the separation of sodium chloride is with advantage carried out at a temperature not exceeding about 10–12° C. to avoid precipitation of calcium hypochlorite di-hydrate; the range of 0–10° C. is usually satisfactory although lower temperatures may be used. It is advantageous to maintain a temperature approximating 0° C. or lower during separation of the crystallized triple salt from the mother liquor; lower temperatures improve the yield.

The invention may be further illustrated by the following type reaction, but here also it will be understood that this is intended but to illustrate the invention in one conventional form:

$$4NaOH + Ca(OH)_2 + 3Cl_2 + 9H_2O = Ca(OCl)_2.NaOCl.NaCl.12H_2O + 2NaCl$$

The new triple salt so obtained can itself be employed, for example, for bleaching purposes, as where it is to be used at the place it is produced or before it has had an opportunity of undergoing decomposition. In order to protect it against decomposition it should be maintained at a low temperature, not exceeding 22° C. Or, the new triple salt so obtained can be converted into a stable calcium hypochlorite product in the manner described in the application filed August 16, 1928, Serial No. 300,148, above mentioned.

I claim:

1. The method of producing a new hypochlorite compound, which comprises chlorinating caustic soda and calcium hydroxide in a solution saturated with respect to sodium chloride and the triple salt $$Ca(OCl)_2.NaOCl.NaCl.12H_2O$$

under conditions of temperature and concentration such than only sodium chloride precipitates during the chlorination, separating precipitated sodium chloride and, after such separation, crystallizing the said triple salt from the chlorinated solution.

2. The method of producing a new hypochlorite compound, which comprises chlorinating caustic soda and calcium hydroxide in a solution saturated with respect to sodium chloride and the triple salt $$Ca(OCl)_2.NaOCl.NaCl.12H_2O$$

under conditions of temperature and concentration such that only sodium chloride precipitates during the chlorination, separating precipitated sodium chloride and, after such separation, crystallizing the said triple salt from the chlorinated solution while maintaining the solution saturated with respect to sodium chloride.

3. The method of producing a new hypochlorite compound, which comprises chlorinating caustic soda and calcium hydroxide in the proportion of two equivalents of the former to one of the latter, in a solution saturated with respect to sodium chloride and the triple salt $Ca(OCl)_2.NaOCl.NaCl.12H_2O$ under conditions of temperature and concentration such that only sodium chloride precipitates during the chlorination, separating precipitated sodium chloride and, after such separation, crystallizing the said triple salt from the chlorinated solution.

4. The method of producing a new hypochlorite compound, which comprises chlorinating caustic soda and calcium hydroxide in a solution saturated with respect to sodium chloride and the triple salt $$Ca(OCl)_2.NaOCl.NaCl.12H_2O$$

under conditions of temperature and concentration such that only sodium chloride precipitates during the chlorination, separating precipitated sodium chloride and, after such separation, adding caustic soda and calcium hydroxide to the chlorinated solution and continuing the chlorination under conditions of temperature and concentration such that a triple salt of calcium hypochlorite, sodium hypochlorite and sodium chloride will precipitate, and precipitating and separating this triple salt from the chlorinated solution.

5. The method of producing a new hypochlorite compound, which comprises chlorinating caustic soda and calcium hydroxide in the proportion of two equivalents of the former to one of the latter, in a solution saturated with respect to sodium chloride and the triple salt $Ca(OCl)_2.NaOCl.NaCl.12H_2O$ under conditions of temperature and concentration such that only sodium chloride precipitates during the chlorination, separating precipitated sodium chloride and, after such separation, adding caustic soda and calcium hydroxide in the same proportion, to the chlorinated solution and continuing the chlorination under conditions of temperature and concentration such that a triple salt of calcium hypochlorite, sodium hypochlorite and sodium chloride will precipitate and precipitating and separating this triple salt from the chlorinated solution.

6. The method of producing a new hypochlorite compound, which comprises chlorinating caustic soda and calcium hydroxide in the proportion of two equivalents of the former to one of the latter, in a solution saturated with respect to sodium chloride and the triple salt $Ca(OCl)_2.NaOCl.NaCl.12H_2O$ under conditions of temperature and concentration such that only sodium chloride precipitates during the chlorination, separating precipitated sodium chloride and, after such separation, adding caustic soda and calcium hydroxide in the same proportion, to the chlorinated solution and continuing the chlorination under conditions of temperature and concentration such that a triple salt of calcium hypochlorite, sodium hypochlorite and sodium chloride will precipitate, precipitating and separating this triple salt from the chlorinated solution and reusing the mother liquor from which the precipitated triple salt has been separated in the chlorination of further quantities of caustic soda and calcium hydroxide in the process.

In testimony whereof I affix my signature.

ROBERT B. MacMULLIN.